(12) United States Patent
Olsson et al.

(10) Patent No.: US 11,800,399 B2
(45) Date of Patent: Oct. 24, 2023

(54) SYMBOL PROCESSING METHOD AND RELATED DEVICE

(71) Applicant: HUAWEI TECHNOLOGIES CO., LTD., Guangdong (CN)

(72) Inventors: Magnus Olsson, Kista (SE); Zhenghu Ding, Shanghai (CN); Jiang Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 17/127,573

(22) Filed: Dec. 18, 2020

(65) Prior Publication Data
US 2021/0105658 A1  Apr. 8, 2021

Related U.S. Application Data

(63) Continuation of application No. PCT/CN2018/091917, filed on Jun. 20, 2018.

(51) Int. Cl.
*H04W 28/02* (2009.01)
*H04W 4/06* (2009.01)
*H04W 52/02* (2009.01)
*H04W 72/0446* (2023.01)

(52) U.S. Cl.
CPC ......... *H04W 28/0273* (2013.01); *H04W 4/06* (2013.01); *H04W 28/0289* (2013.01); *H04W 52/0206* (2013.01); *H04W 72/0446* (2013.01)

(58) Field of Classification Search
CPC .............. H04W 28/0273; H04W 4/06; H04W 28/0289; H04W 52/0206; H04W 72/0446; Y02D 30/70
See application file for complete search history.

(56) References Cited

U.S. PATENT DOCUMENTS

| 9,072,054 B2 | 6/2015 | Ji et al. |
| 2013/0070635 A1* | 3/2013 | Suo .................. H04W 52/0206 370/252 |
| 2013/0163501 A1 | 6/2013 | Chen et al. |
| 2014/0010131 A1 | 1/2014 | Gaal et al. |

(Continued)

FOREIGN PATENT DOCUMENTS

| CN | 101389050 A | 3/2009 |
| CN | 101677311 A | 3/2010 |

(Continued)

OTHER PUBLICATIONS

PCT International Search Report and Written Opinion issued in International Application No. PCT/CN2018/091917 dated Feb. 27, 2019, 17 pages (with English translation).

(Continued)

*Primary Examiner* — Rina C Pancholi
(74) *Attorney, Agent, or Firm* — Fish & Richardson P.C.

(57) ABSTRACT

The present disclosure relates to symbol processing methods and apparatuses. One example method, applied to a baseband unit, includes determining, based on a current traffic volume of a cell, a target subframe in which energy saving is required, where the target subframe is a service-idle subframe, and modifying a format of the target subframe, where after modifying the format of the target subframe, each symbol in the target subframe has a same symbol periodicity.

12 Claims, 11 Drawing Sheets

(56) References Cited

U.S. PATENT DOCUMENTS

2014/0086173 A1* 3/2014 Sadeghi ............ H04W 68/02
370/328
2016/0380668 A1 12/2016 Aoki et al.

FOREIGN PATENT DOCUMENTS

| CN | 101741774 | A | 6/2010 |
|---|---|---|---|
| CN | 101742698 | A | 6/2010 |
| CN | 101998263 | A | 3/2011 |
| CN | 102223604 | A | 10/2011 |
| CN | 102340852 | A | 2/2012 |
| CN | 102340854 | A | 2/2012 |
| CN | 102348163 | A | 2/2012 |
| CN | 102348264 | A | 2/2012 |
| CN | 102612166 | A | 7/2012 |
| CN | 103997774 | A | 8/2014 |
| CN | 104604195 | A | 5/2015 |
| CN | 104618995 | A | 5/2015 |
| CN | 106332244 | A | 1/2017 |
| CN | 106464626 | A | 2/2017 |
| CN | 107294896 | A | 10/2017 |
| EP | 2568732 | A1 | 3/2013 |
| EP | 3157277 | A1 | 4/2017 |
| EP | 3285416 | A1 | 2/2018 |
| WO | 2011158436 | A1 | 12/2011 |
| WO | 2017000791 | A1 | 1/2017 |
| WO | WO-2017000791 | A1 * | 1/2017 |

OTHER PUBLICATIONS

Office Action in Chinese Application No. 201880093741.5, dated Apr. 22, 2021, 8 pages.
Intel et al., "Correction on deriving the length of the non-MBSFN region," 3GPP TSG-RAN WG1 Meeting #75, R1-136076, San Francisco, USA, Nov. 11-15, 2013, 3 pages.
Intel et al., "Clarification on non-MBSFN Region," 3GPP TSG-RAN WG1 #74bis, R1-135611, San Francisco, USA, Nov. 11-15, 2013, 5 pages.
Huawei, HiSilicon, "Scenario and design criteria on flexible numerologies," 3GPP TSG RAN WG1 Meeting #84bis, R1-162156, Busan, Korea, Apr. 11-15, 2016, 7 pages.
Office Action issued in Chinese Application No. 201880093741.5 dated Nov. 2, 2021, 8 pages.
Extended European Search Report issued in European Application No. 18923624.3 dated May 17, 2021, 14 pages.
Office Action issued in Chinese Application No. 201880093741.5 dated Jan. 28, 2022, 5 pages.

* cited by examiner

SYMBOL PROCESSING METHOD AND RELATED DEVICE

CROSS-REFERENCE TO RELATED APPLICATIONS

This application is a continuation of International Application No. PCT/CN2018/091917, filed on Jun. 20, 2018, the disclosure of which is hereby incorporated by reference in its entirety.

TECHNICAL FIELD

The present invention relates to the field of communications technologies, and in particular, to a symbol processing method and a related device.

BACKGROUND

Power consumption of a base station is an important component of power consumption of an entire mobile communications network, and in the base station, power consumption of a radio unit (Radio Unit, RU) accounts for a main part, where a power consumption ratio of a power amplifier (Power Amplifier, PA) is very high in the RU. Usually, the PA is always in an on state, and the PA generates power consumption even when there is no data being sent. For the base station, if the PA is shut down within a symbol periodicity with no actual content being sent, power consumption of the entire RU can be effectively reduced.

A transmission periodicity of a symbol is used as a unit for PA shutdown. In each subframe, pilot symbols (Reference Signal, RS) exist at some symbol locations, and the PA cannot be shut down. If another symbol is not used for transmitting other actual content, the RU may shut down the PA within a periodicity of the symbol. To increase opportunities of symbol power saving, when load is relatively low, services may be scheduled in only some subframes and other subframes become idle subframes. In addition, these idle subframes may be configured as multimedia broadcast multicast service single frequency network (Multimedia Broadcast Multicast Service Single Frequency Network, MBSFN) subframes after the services are scheduled in only some subframes, where the MBSFN subframe has symbols of different lengths. The MBSFN subframe contains fewer pilot symbols, and therefore power saving can be performed on more symbols in the MBSFN subframe.

A specific implementation of symbol power saving may be that the RU exchanges information with a baseband unit (Baseband Unit, BBU) in advance, learns of a start location and a length of each symbol from the BBU, then determines symbols on which no data is sent, and performs power saving on the symbols. However, in the foregoing method, the information exchange needs to be performed between the RU and the BBU, a relatively large quantity of information resources are occupied, and a process is relatively cumbersome.

SUMMARY

A technical problem to be resolved in this application is about how to reduce occupied information resources to some extent and simplify a symbol power saving procedure.

According to a first aspect, this application provides a symbol processing method. The method may be applied to a baseband unit, and may include:

determining, based on a current traffic volume of a cell, a target subframe in which energy saving is required, and modifying a format of the target subframe, so that symbol periodicities of symbols are the same, where the target subframe is a service-idle subframe, that is, a subframe in which no service data is transmitted.

One radio frame may include a plurality of subframes, and one subframe may include a plurality of symbols. Therefore, when shutting down a power amplifier, a radio unit performs processing by using a symbol as a unit. The method shown in the first aspect is implemented, and the baseband unit modifies the format of the service-idle subframe, so that a length of each symbol is normalized. In other words, the symbol periodicities of the symbols are the same. Therefore, in a processing process of performing symbol power saving (shutting down the PA within a symbol periodicity of a symbol on which power saving needs to be performed) by the radio unit, shutdown processing may be performed based on a same symbol periodicity, and the radio unit does not need to interact with the base station processing unit in advance. This reduces occupied information resources to some extent, and simplifies a symbol power saving procedure.

In a feasible implementation, after modifying the format of the target subframe, the baseband unit may further notify a terminal of configuration information of the target subframe, so that the terminal avoids measuring the target subframe, where the configuration information may include at least a quantity of target subframes and location information of the target subframes.

Because the format of the target subframe is modified, if measuring the target subframe, the terminal may not detect an RS symbol at a preset location of the target subframe. Consequently, the terminal may incorrectly determine that a cell signal is relatively poor, and a case such as a call drop or signal instability occurs. Therefore, the foregoing feasible implementation is implemented, and the baseband unit notifies the terminal of the configuration information of the target subframe. In this way, when performing cell signal measurement, the terminal can avoid measuring the target subframe, thereby effectively avoiding the foregoing case.

In a feasible implementation, the target subframe may be an MBSFN subframe. Modifying the format of the target subframe by the baseband unit may be modifying a format of a symbol that uses an extended cyclic prefix and that is in the target subframe to a format of a symbol with a normal cyclic prefix, so that the symbol periodicities of the symbols are the same as a symbol periodicity of the symbol with the normal cyclic prefix. A total quantity of symbols of the target subframe is the same as a total quantity of symbols of a subframe with the normal cyclic prefix.

When performing symbol detection, if detecting a second symbol on which service data is sent, the radio unit enables the PA to be in an on state based on the periodicity of the symbol with the normal CP. It can be learned that, the foregoing feasible implementation is implemented, and after the BBU modifies the format of the target subframe, if the RU detects a first symbol on which no service data is sent, the RU may also shut down the PA based on the periodicity of the symbol with the normal CP. This reduces transmission resource overheads between the BBU and the RU, and simplifies the symbol power saving procedure.

In a feasible implementation, before the determining, based on a current traffic volume of a cell, a target subframe in which energy saving is required, the baseband unit may further determine whether a target-subframe-related configuration function is in an enabled state; and if the targetsubframe-related configuration function is in the enabled state, the target subframe in which energy saving is required may be determined based on the current traffic volume of the cell.

In a feasible implementation, the target-subframe-related configuration function may be enabled by a user. The user may send an enable instruction through a configuration end on a base station side. After receiving the enable instruction, the baseband unit may determine, based on the enable instruction, that the target-subframe-related configuration function is already enabled.

In a feasible implementation, the determining, by the baseband unit based on a current traffic volume of a cell, a target subframe in which energy saving is required may be detecting the current traffic volume of the cell based on a preset periodicity, and determining, based on the detected current traffic volume, the target subframe in which energy saving is required within the preset periodicity. Determined content includes at least a quantity of target subframes and location information of the target subframes.

It can be learned that, the foregoing optional implementation is implemented, and the baseband unit may perform periodic determining and adjustment on the target subframe based on the current traffic volume of the cell, so that the configured target subframe can be better adapted to the current traffic volume, and normal transmission of service data is not affected.

According to a second aspect, this application provides a symbol processing method. The method may be applied to a radio unit, and may include: The radio unit detects numeric values of first N sampling points on each symbol. If detecting that numeric values of first N sampling points on a first symbol are all 0, the radio unit may determine that no service data is sent on the first symbol, and may shut down a power amplifier within a symbol periodicity of the first symbol.

Symbol periodicities of all symbols are the same. The baseband unit modifies a format of a service-idle target subframe, so that the symbol periodicities of the symbols are the same.

The method shown in the second aspect is implemented, and the baseband unit modifies the format of the service-idle subframe, so that a length of each symbol is normalized. In other words, the symbol periodicities of the symbols are the same. Therefore, in a processing process of performing symbol power saving by the radio unit, shutdown processing may be performed based on a same symbol periodicity, and the radio unit does not need to interact with the base station processing unit in advance. This reduces occupied information resources to some extent, and simplifies a symbol power saving procedure.

In a feasible implementation, if detecting that numeric values of first N sampling points on a second symbol are not all 0, the radio unit may determine that service data is sent on the second symbol, and turn on the power amplifier at a preset time point before a symbol periodicity of the second symbol arrives.

It takes some time to turn on the power amplifier. Therefore, the foregoing feasible implementation is implemented, so that when detecting that there is the second symbol on which service data is sent, the radio unit turns on the power amplifier a period of time in advance. In this way, normal transmission of the service data can be not affected.

According to a third aspect, a baseband unit is provided. The baseband unit has a function of implementing behavior of the baseband unit in the first aspect or the possible implementations of the first aspect. The function may be implemented by hardware, or may be implemented by executing corresponding software by hardware. The hardware or the software includes one or more modules corresponding to the foregoing function. The module may be software and/or hardware. Based on a same inventive concept, for a problem-resolving principle and beneficial effects of the baseband unit, refer to the first aspect, the possible method implementations of the first aspect, and the brought beneficial effects. Therefore, for implementation of the baseband unit, refer to the first aspect or the possible method implementations of the first aspect. No repeated description is provided again.

According to a fourth aspect, a radio unit is provided. The radio unit has a function of implementing behavior of the radio unit in the second aspect or the possible implementations of the second aspect. The function may be implemented by hardware, or may be implemented by executing corresponding software by hardware. The hardware or the software includes one or more modules corresponding to the foregoing function. The module may be software and/or hardware. Based on a same inventive concept, for a problem-resolving principle and beneficial effects of the radio unit, refer to the second aspect, the possible method implementations of the second aspect, and the brought beneficial effects. Therefore, for implementation of the radio unit, refer to the second aspect or the possible method implementations of the second aspect. No repeated description is provided again.

According to a fifth aspect, a base station is provided. The base station includes a radio unit and a baseband unit. The baseband unit can implement the solution in the method design of the first aspect. For problem-resolving implementations and beneficial effects of the baseband unit, refer to the first aspect or the possible method implementations of the first aspect, and the beneficial effects. No repeated description is provided again. The radio unit may implement the solution in the method design in the second aspect. For problem-resolving implementations and beneficial effects of the radio unit, refer to the second aspect or the possible method implementations of the second aspect, and the beneficial effects. No repeated description is provided again.

According to a sixth aspect, a base station is provided, including: a memory, configured to store one or more programs, and a processor, configured to invoke the program stored in the memory to implement the solution in the method design of the first aspect. For problem-resolving implementations and beneficial effects of the base station, refer to the first aspect or the possible method implementations of the first aspect, and the beneficial effects. No repeated description is provided again.

According to a seventh aspect, a computer-readable storage medium is provided. The computer-storage medium stores a computer program. The computer program includes a program instruction. When the program instruction is executed by a processor, the processor is enabled to perform the method in the first aspect or the possible method implementations of the first aspect, and the beneficial effects; and/or the method in the second aspect or the possible method implementations of the second aspect, and the beneficial effects. No repeated description is provided again.

DESCRIPTION OF EMBODIMENTS

The following correspondingly describes the technical solutions in the embodiments of this application with reference to the accompanying drawings in the embodiments of this application.

To better understand a symbol processing method and a related device provided in the embodiments of the present invention, the following first describes a structure of a base station in this application. It should be noted that the base station may be applied to a mobile communications system that is not limited to long term evolution (Long Term Evolution, LTE), a future evolved 5th generation mobile communications (the 5th Generation, 5G) system, a new radio (NR) system, a machine to machine (Machine to Machine, M2M) communications system, and the like.

Figure 1:
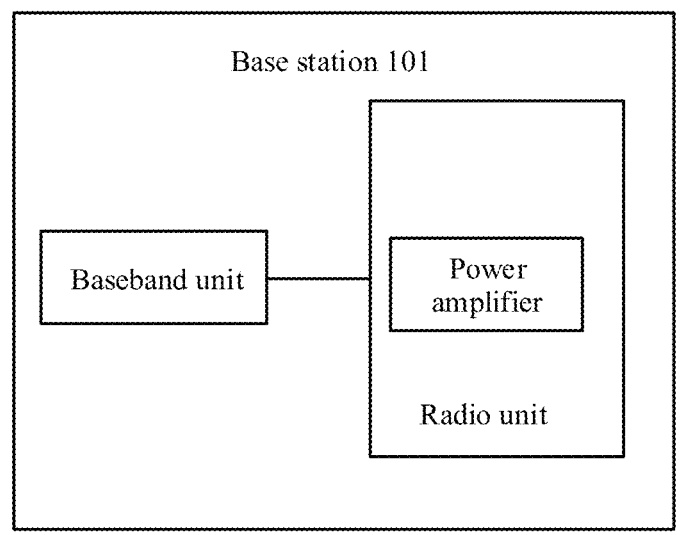
FIG. 1 is a schematic structural diagram of a base station according to an embodiment of this application.

FIG. 1 is a schematic structural diagram of a base station according to an embodiment of this application. The base station 101 may be a base transceiver station (Base Transceiver Station, BTS) in a time division-synchronous code division multiple access (Time Division Synchronous Code Division Multiple Access, TD-SCDMA) system, an evolved NodeB (Evolutional Node B, eNodeB) in an LTE system, or a base station in a 5G system or a new radio (NR) system. Alternatively, the base station may be an access point (Access Point, AP), a transmission node (Trans TRP), a central unit (Central Unit, CU), or another network entity, and may include some or all of functions of the foregoing network entities.

Specifically, the base station 101 may include two basic functional modules: a baseband unit (Baseband Unit, BBU) and a radio unit (Radio Unit, RU). The BBU may complete functions such as baseband processing functions (coding, multiplexing, modulation, spectrum spreading, and the like), signaling processing, local and remote operation and maintenance of a Uu interface, and functions of working status monitoring and alarm information reporting of the base station. The RU may include at least one power amplifier (Power Amplifier, PA).

Power consumption of the base station is an important part of power consumption of an entire mobile network. In addition, in the base station, power consumption of the RU accounts for a main part, and power consumption of the PA accounts for a very large proportion in the RU. Usually, the PA is always in an on state, and the PA generates power consumption even at a moment when there is no data being sent. For the base station, if the PA is shut down within a symbol periodicity with no actual content being sent, power consumption of the RU can be effectively reduced.

Figure 2:
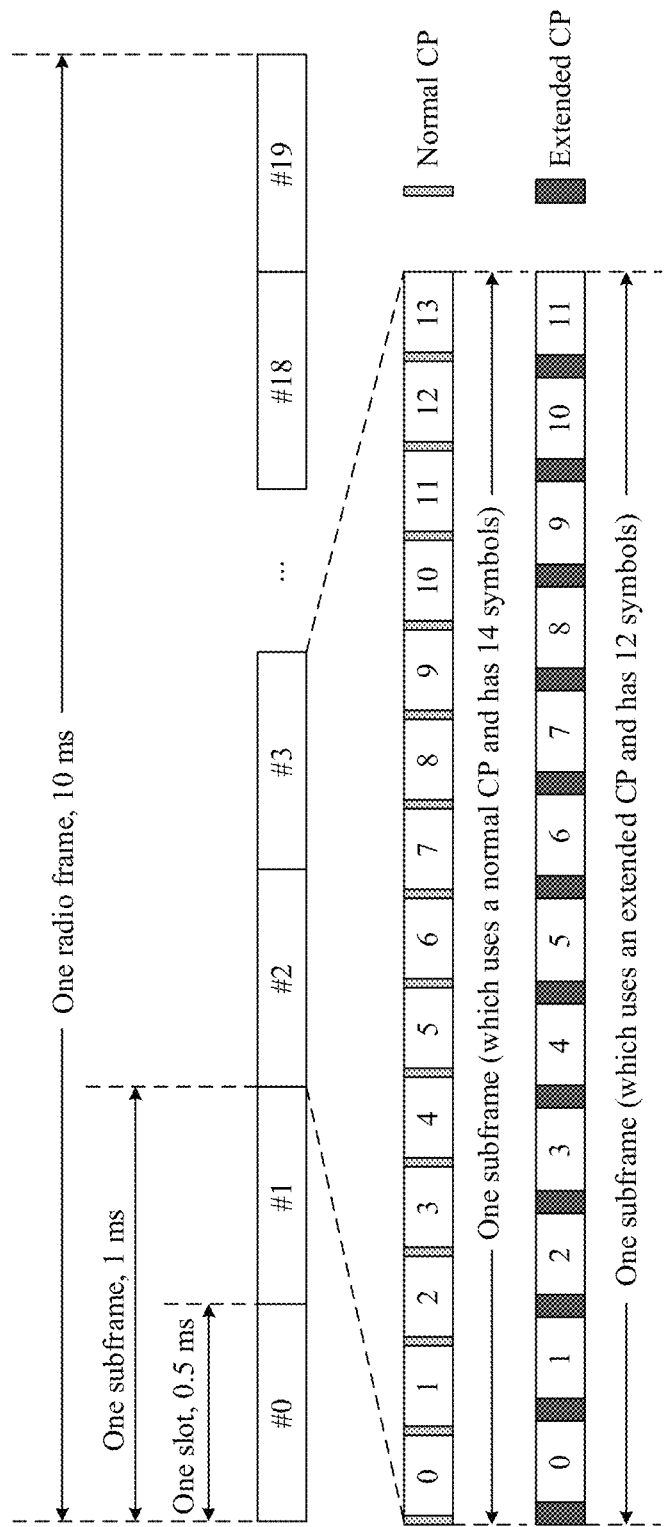
FIG. 2 is a schematic structural diagram of an LTE radio frame according to an embodiment of this application.

Long term evolution (Long Term Evolution, LTE) is used as an example. FIG. 2 is a schematic structural diagram of an LTE radio frame according to an embodiment of this application. It can be learned from FIG. 2 that a length of one radio frame is 10 ms, and the radio frame may include 10 subframes. Each subframe further includes two slots (slot), and each slot is 0.5 ms. For a normal cyclic prefix (Cyclic Prefix, CP), one subframe may include 14 symbols. For an extended CP, one subframe may include 12 symbols.

In each subframe, pilot symbols exist at some fixed symbol locations, and some special data needs to be sent on the pilot symbols. Therefore, within a symbol periodicity of the pilot symbol, a PA cannot be shut down. However, if there is no actual service data transmitted on another symbol different from the pilot symbol, the RU may shut down the PA within a periodicity of the symbol. In addition, lower cell load (that is, a smaller cell traffic volume) indicates more idle symbols on which no actual content is transmitted and more opportunities of triggering symbol power saving (that is, the PA is shut down within a periodicity of the symbol).

To increase opportunities of symbol power saving, when the cell load is relatively low (that is, the cell traffic volume is relatively small), service data may be scheduled in only some subframes and other subframes become idle subframes. Further, these idle subframes may be configured as subframes in a format of a multimedia broadcast multicast service single frequency network (Multimedia Broadcast Multicast Service Single Frequency Network, MBSFN) subframe. The MBSFN subframe contains fewer pilot symbols. Therefore, configuring the idle subframes as the MBSFN subframes can increase the opportunities of symbol power saving.

Figure 3:
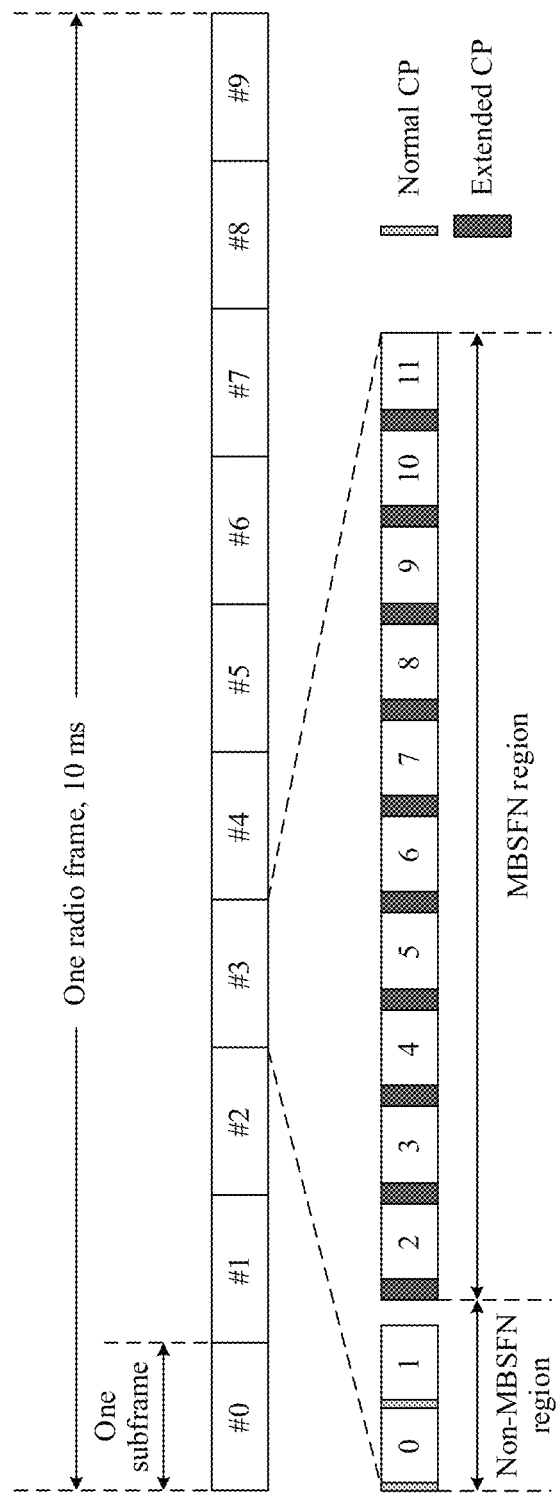
FIG. 3 is a schematic structural diagram of an MBSFN subframe according to an embodiment of this application.

FIG. 3 is a schematic structural diagram of an MBSFN subframe according to an embodiment of this application. It can be learned from FIG. 3 that symbols in the MBSFN subframe may be divided into two parts: a symbol in a non-MBSFN region (Non-MBSFN Region) and a symbol in an MBSFN region (MBSFN Region). One or two symbols can be configured in the non-MBSFN region. All symbols except for the symbols in the non-MBSFN region are in the MBSFN region. A CP length of each symbol in the non-MBSFN region is the same as a CP (which is usually a normal CP) length of a subframe 0 in a radio frame in which the symbol is located, and the symbol in the MBSFN region may use an extended CP. To ensure time sequence alignment, a part of a blank area after the last symbol with a normal CP in the non-MBSFN region is filled with 0. It should be noted that FIG. 3 uses an example in which the non-MBSFN region includes two symbols with a normal CP.

It can be learned that when the MBSFN subframe is configured, symbols of different lengths exist. When the RU performs symbol power saving, processing needs to be performed on the two types of symbols of different lengths. A specific implementation of symbol power saving may include two manners: One is that a BBU controls an RU to perform symbol power saving. The other is that an RU exchanges information with a baseband unit (Baseband Unit, BBU) in advance, learns of a start location and a length of each symbol from the BBU, then determines symbols on which no data is sent, and performs power saving on the symbols. In both the foregoing two manners, interaction between the RU and the BBU is required, a relatively large quantity of information resources are occupied, and a process is relatively cumbersome.

Figure 4:
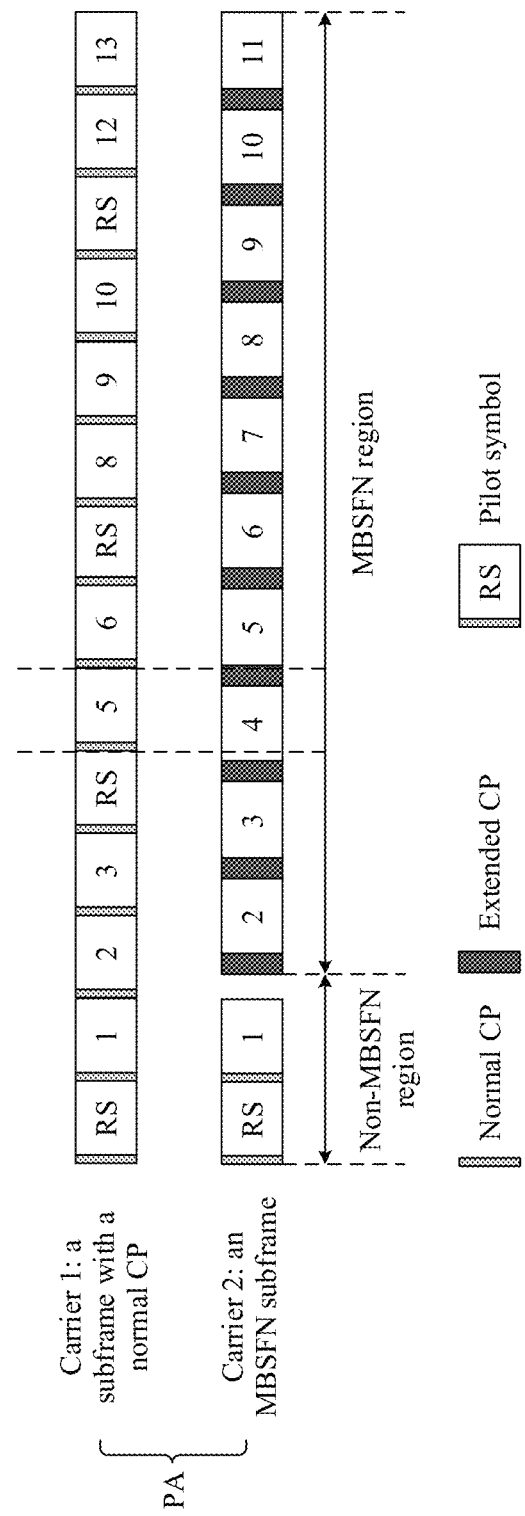
FIG. 4 is a schematic diagram of a scenario in which a plurality of carriers share one PA according to an embodiment of this application.

In addition, in a scenario in which a plurality of LTE carriers share one PA, if formats of subframes on different carriers are different at a moment, for example, as shown in FIG. 4, if a format of a subframe with a normal CP is used on a carrier 1, and an MBSFN subframe is configured on a carrier 2, only head-to-tail alignment of subframes can be ensured for the two types of subframes. However, some symbols in the MBSFN subframe use a subframe format of an extended CP, and a length of the symbol is different from that of a symbol in the subframe with the normal CP. Therefore, a boundary of a symbol in an MBSFN region on the carrier 1 is not aligned with a boundary of a corresponding normal CP on the carrier 2 (for example, a boundary of a symbol 5 on the carrier 1 is not aligned with a boundary of a symbol 4 on the carrier 2). In this case, because boundaries of some symbols are not aligned (that is, symbol periodicities of the symbols are different) when the subframe with the normal CP and the MBSFN subframe coexist at a same time in the scenario in which the plurality of carriers share one PA, when symbol power saving is performed, symbol power saving cannot be effectively performed on both the carrier 1 and the carrier 2 in the foregoing two manners.

Therefore, this application further provides a symbol processing method and a related device, to reduce occupied information resources to some extent and simplify a symbol power saving procedure. In addition, a problem that symbol power saving cannot be effectively performed because an RU cannot accurately determine symbol boundaries during the symbol power saving due to different symbol lengths when a plurality of carriers share one PA and a subframe with a normal CP and an MBSFN subframe coexist can be resolved.

For example, the symbol processing method shown in this application may be applied to the following two scenarios.

Figure 5:
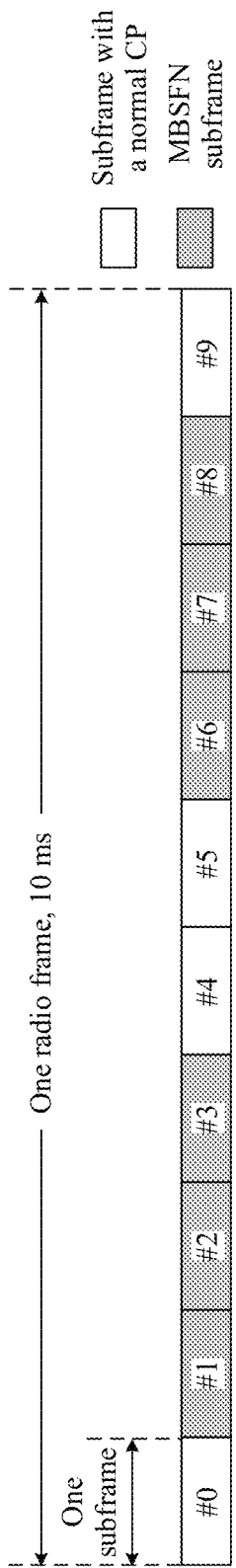
FIG. 5 is a schematic diagram of a scenario in which a single carrier uses one PA according to an embodiment of this application.

Scenario 1: A single carrier is configured on a single PA. For example, as shown in FIG. 5, only one radio frame is correspondingly configured on a single PA, and the radio frame may include a subframe with a normal CP and an MBSFN subframe. In this scenario, a problem that symbols on different carriers are not aligned when a plurality of carriers share one PA does not exist.

Figure 6:
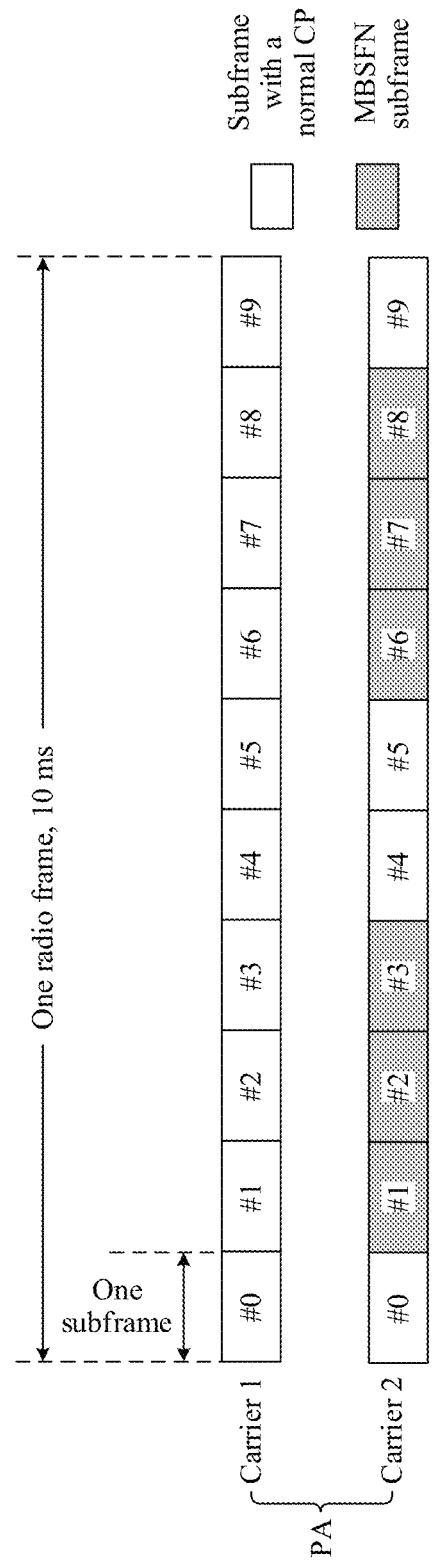
FIG. 6 is a schematic diagram of another scenario in which a plurality of carriers share one PA according to an embodiment of this application.

Scenario 2: A plurality of carriers are configured on a single PA. For example, as shown in FIG. 6, two carriers are configured on one PA, which are respectively a carrier 1 and a carrier 2. Subframes on the carrier 1 are all subframes with a normal CP, and subframes on the carrier 2 include subframes of two formats: a subframe with a normal CP and an MBSFN subframe.

In an embodiment, a maximum of six MBSFN subframes may be configured in the radio frames that are in the foregoing two scenarios. It should be learned that the foregoing two scenarios are merely examples, but not exhaustive examples, and should not be construed as a limitation on this application.

Figure 7:
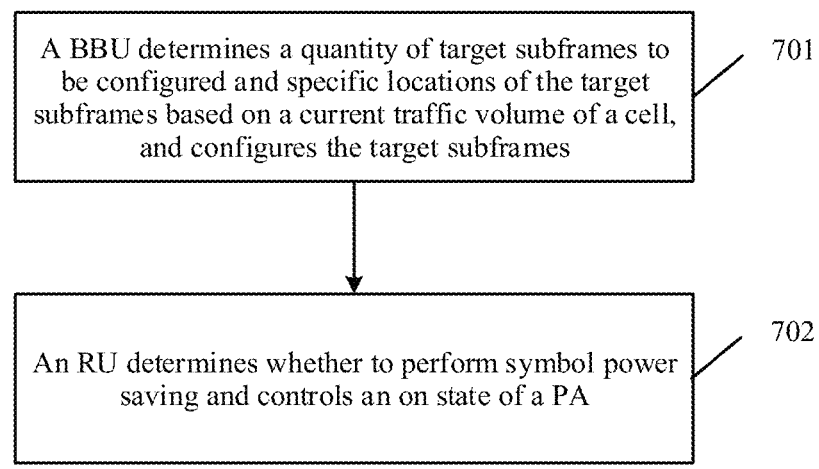
FIG. 7 is a schematic flowchart of symbol processing according to an embodiment of this application.

FIG. 7 is a schematic flowchart of symbol processing according to this application. In 701, a BBU may determine a quantity of target subframes to be configured and specific locations of the target subframes based on a current traffic volume of a cell, and configure the target subframes.

In an embodiment, the BBU may determine a quantity of target subframes that can be configured and specific locations of the target subframes based on a current traffic volume of a cell (refer to a downlink physical resource block (physical resource block, PRB) utilization rate of the cell), and may limit a service to be scheduled only in another subframe that is not configured as having a format of the target subframe.

In an embodiment, the target subframe may be an MBSFN subframe. The BBU may modify a format of the determined MBSFN subframe, and change a symbol that uses an extended CP in the MBSFN region to a symbol with a normal CP, so that a total quantity of symbols of the entire subframe may be maintained at 14. In this type of MBSFN subframes, no valid data is transmitted. Therefore, modifying the subframe format does not affect demodulation of a terminal user. For example, referring to FIG. 8, lengths of all symbols in the target subframe are the same, and a length of each symbol may be the same as a length of a symbol in a subframe with a normal CP.

In an embodiment, after configuring the target subframes, the BBU may notify a terminal of configuration information of these target subframes by using a system message.

Figure 8:
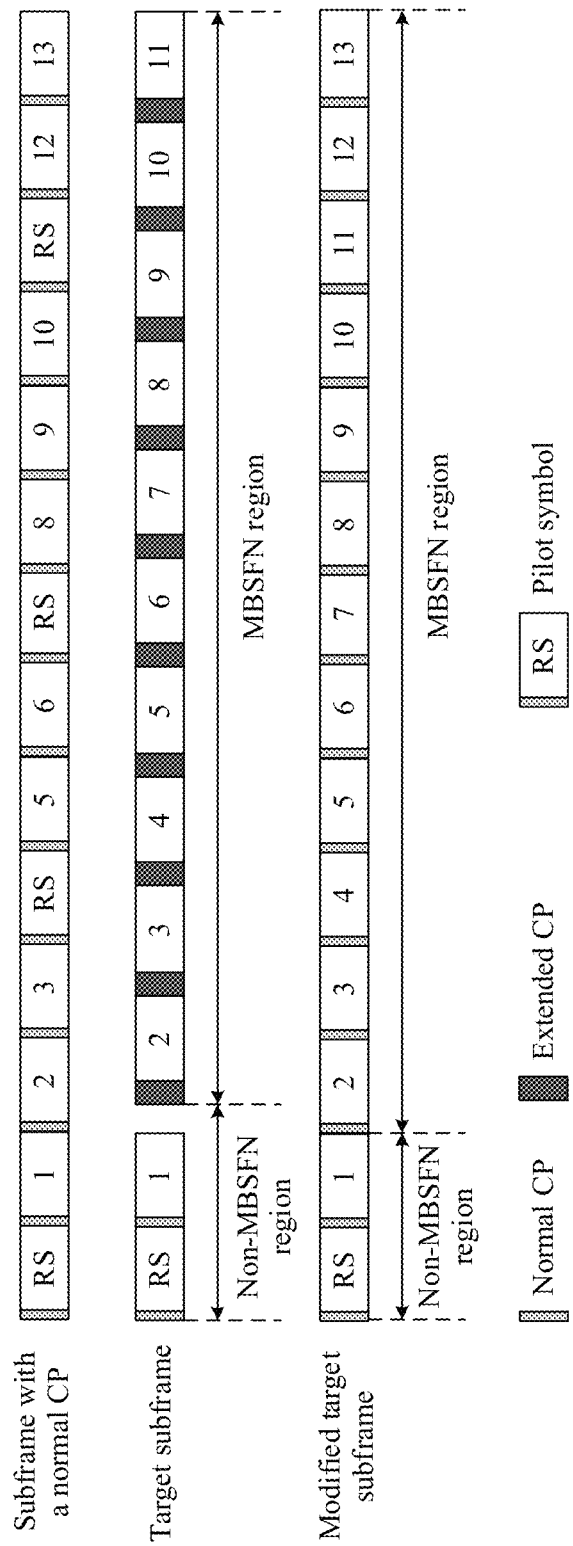
FIG. 8 is a schematic structural diagram of a target subframe according to an embodiment of this application.

It should be noted that a location in a scenario with dual antenna ports is used as an example of a location of a pilot symbol in FIG. 8. It should be learned that in another scenario, a location of the pilot symbol may be another location.

In 702, after the BBU configures the target subframes, an RU may determine whether to perform symbol power saving, and control an on state of a PA.

In an embodiment, the RU determines, based on whether numeric values of first N sampling points on each symbol in the subframe are all zeros, whether service data is sent on the symbol. When determining that there is a first symbol on which no service data is sent, the RU shuts down the PA within a symbol periodicity of the first symbol, to reduce power consumption of the RU.

For example, in the foregoing scenario 1, if only a single carrier is configured on a single PA, the BBU modifies a format of a target subframe on the single carrier, so that a length of each symbol is the same as a length of a symbol with a normal CP. In other words, a symbol periodicity of each symbol is the same as a periodicity of the symbol with the normal CP. Then, the RU may determine numeric values of first N sampling points on each symbol. When determining that a first symbol on which no service data is sent exists on the carrier, the RU shuts down the PA within a symbol periodicity of the first symbol to reduce power consumption of the RU.

For another example, in the foregoing scenario 2, if a plurality of carriers are configured on a single PA, the BBU may first modify formats of target subframes on the plurality of carriers, so that a length of each symbol is the same as a length of a symbol with a normal CP. In other words, a symbol periodicity of each symbol is the same as a periodicity of the symbol with the normal CP. Then, the RU may simultaneously determine numeric values of first N sampling points on symbols aligned on the plurality of carriers. When determining that first symbols on which no service data is sent exist at locations of the symbols aligned on the plurality of carriers, the RU shuts down the PA within a symbol periodicity of the first symbol to reduce power consumption of the RU.

It can be learned that the format of the target subframe is modified, so that the lengths of the symbols are the same, and periodicities of the symbols are the same. Therefore, the BBU no longer needs to send a subframe format to the RU, and the RU may perform an operation of symbol power saving based on the length of the symbol with the normal CP. The BBU and RU do not exchange information with each other. This can reduce occupied information resources and simplify a symbol power saving procedure.

To describe this application more clearly, the following describes method embodiments of this application.

Figure 9:
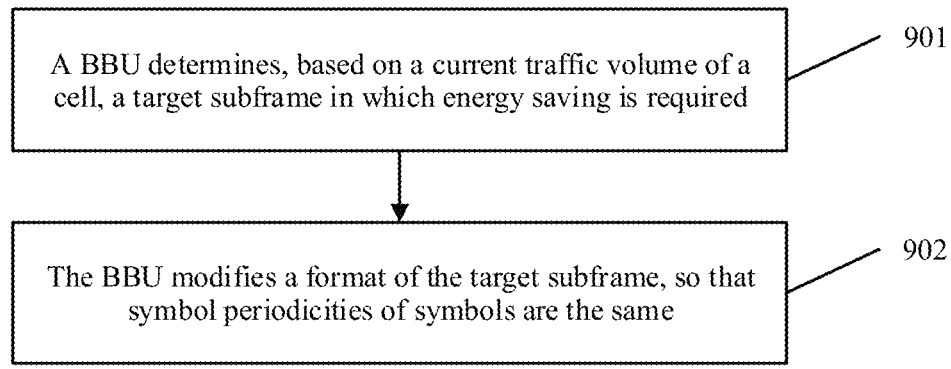
FIG. 9 is a schematic flowchart of a symbol processing method according to an embodiment of this application.

FIG. 9 is a schematic flowchart of a symbol processing method according to this application. The method shown in FIG. 9 may include the following steps.

901. A BBU determines, based on a current traffic volume of a cell, a target subframe in which energy saving is required.

The target subframe is a service-idle subframe. The BBU may determine a quantity of target subframes that require energy saving and location information of the target subframes.

In an embodiment, the current traffic volume of the cell may be measured based on a downlink PRB utilization rate of the cell. For example, if the downlink PRB utilization rate is 10%, the BBU may determine that five target subframes require energy saving. If the downlink PRB utilization rate ranges from 10% to 30%, the BBU may determine that four target subframes require energy saving. If the downlink PRB utilization rate ranges from 30% to 50%, the BBU may determine that two target subframes require energy saving. Certainly, the foregoing manners are merely examples and are not exhaustive examples, and manners include but are not limited to the foregoing optional manners.

In an embodiment, the BBU may determine that a format of the target subframe is a format of an MBSFN subframe. The MBSFN subframe contains fewer pilot symbols. Therefore, configuring idle subframes as MBSFN subframes can increase opportunities of symbol power saving. For example, the format of the MBSFN subframe may be shown in FIG. 3.

In an embodiment, before the determining, based on a current traffic volume of a cell, a target subframe in which energy saving is required, the BBU may further determine whether a target-subframe-related configuration function is in an enabled state; and if the target-subframe-related configuration function is in the enabled state, the target subframe in which energy saving is required is determined based on the current traffic volume of the cell.

For example, a user may send an enable instruction to the BBU through a configuration end on a base station side, where the enable instruction may be used to enable the target-subframe-related configuration function. When receiving the enable instruction, the BBU may determine that the target-subframe-related configuration function is in an enabled state.

In an embodiment, if the BBU determines that the target-subframe-related configuration function is in a disabled state, the BBU may not perform the procedures shown in 901 and 902.

In an embodiment, if the BBU determines that the target-subframe-related configuration function is in a disabled state, after determining the target subframe, the BBU may not modify the format of the target subframe, to be specific, may perform a corresponding configuration of the target subframe based on an original format of the MBSFN subframe. Further, the BBU may control an RU to shut down a PA, or the BBU exchanges information with the PA in advance, and notifies the RU of configured information such as a location of a symbol and a length of the symbol. When detecting a first symbol on which no service data is sent, the RU determines a symbol periodicity of the first symbol based on the information notified by the BBU in advance, and shuts down the PA within the symbol periodicity of the first symbol.

902. The BBU modifies a format of the target subframe, so that symbol periodicities of symbols are the same.

In an embodiment, the target subframe is an MBSFN subframe, and the modifying a format of the target subframe may include: modifying a format of a symbol that uses an extended CP in the target subframe to a format of a symbol with a normal CP, so that the symbol periodicities of the symbols in the target subframe are the same as a symbol periodicity of the symbol with the normal CP. A total quantity of symbols in the target subframe is the same as a total quantity of symbols in a subframe with the normal CP.

For example, a carrier on which an MBSFN subframe is configured may include two types of subframes: an MBSFN subframe and a subframe with a normal CP. The MBSFN subframe may include two types of symbols: a symbol with an extended CP and a symbol with a normal CP, and a length of the symbol with the extended CP is different from a length of the symbol with the normal CP. A subframe with a normal CP may include a symbol with the normal CP. The BBU modifies the format of the symbol that uses the extended CP and that is in the MBSFN subframe to the format of the symbol with the normal CP, so that symbol lengths of symbols are the same as a length of a symbol in a subframe with the normal CP, that is, symbol periodicities of the symbols are the same as a periodicity of the symbol with the normal CP.

Usually, when the RU performs symbol detection, if detecting a second symbol on which service data is sent, the RU enables the PA to be in an on state based on the periodicity of the symbol with the normal CP. After the BBU modifies the format of the target subframe, if the RU detects the first symbol on which no service data is sent, the RU may shut down the PA based on the periodicity of the symbol with the normal CP. After the symbol lengths of the symbols are enabled to be the same, the BBU no longer needs to notify the RU of information such as a format and a location of a subframe, thereby reducing transmission resource overheads between the BBU and the RU, and simplifying a symbol power saving procedure.

In addition, the BBU enables the total quantity of symbols in the MBSFN subframe to be the same as the total quantity of symbols in the subframe with the normal CP, so that when a plurality of carriers share one PA, boundaries of the symbols can be aligned. For example, as shown in FIG. 8, a boundary of a symbol in the subframe with the normal CP can be aligned with a boundary of a symbol in a modified target subframe. When the RU detects that a first symbol on which no service data is sent exists at identical locations on different carriers, the RU may shut down the PA based on the periodicity of the symbol with the normal CP.

In an embodiment, after modifying a format of the target subframe, the method further includes: notifying a terminal of configuration information of the target subframe, so that the terminal avoids measuring the target subframe, where the configuration information includes at least a quantity of target subframes and location information of the target subframes.

After modifying the format of the target subframe, the BBU may notify the terminal of a quantity, location information, and the like of modified target subframes by using a system message. When performing cell signal measurement, the terminal can avoid measuring the target subframe. Because the format of the target subframe is modified, if performing cell measurement on the target subframe, the terminal may not detect an RS symbol at a preset location of the target subframe. Consequently, the terminal may incorrectly determine that a cell signal is relatively poor, and a case such as a call drop or signal instability occurs. Therefore, the terminal is notified by using the system message in advance, so that the foregoing case can be effectively avoided.

In an embodiment, for a procedure of interaction between the BBU and the terminal, refer to a notification procedure after a change of a configuration of an MBSFN subframe. Details are not described herein.

In an embodiment, the determining, based on a current traffic volume of a cell, a target subframe in which energy saving is required may include: detecting a current traffic volume of the cell based on a preset periodicity; and determining, based on the detected current traffic volume, the target subframe in which energy saving is required within the preset periodicity, where determined content includes at least a quantity of target subframes and location information of the target subframes.

The BBU may periodically determine and adjust a configuration of the target subframe based on a traffic volume status of the cell. Lower load indicates a larger quantity of target subframes that can be configured.

For example, the preset periodicity may be 100 s. The BBU measures the current traffic volume of the cell every 100 s, and determines, based on the measured current traffic volume, a quantity and locations of target subframes that require energy saving within this periodicity. After this periodicity ends, the BBU may re-measure a current traffic volume of the cell, and determine and adjust a quantity and locations of target subframes.

In an embodiment, each time the configuration changes, the BBU may notify the terminal of configuration information of the target subframe by using a system message.

It can be learned that, according to this embodiment of this application, the BBU determines, based on the current traffic volume of the cell, the target subframe in which energy saving is required, and modifies the format of the target subframe, so that symbol periodicities of symbols on carriers are the same. In this way, the radio unit may detect each symbol. When detecting that there is a first symbol on which no service data is sent, the radio unit may shut down the PA based on a same symbol periodicity, and the BBU no longer needs to exchange information with the RU to notify the RU of content such as a periodicity and a location for symbol power saving, thereby reducing information resource overheads between the BBU and the RU, and simplifying a symbol power saving implementation procedure.

Figure 10:
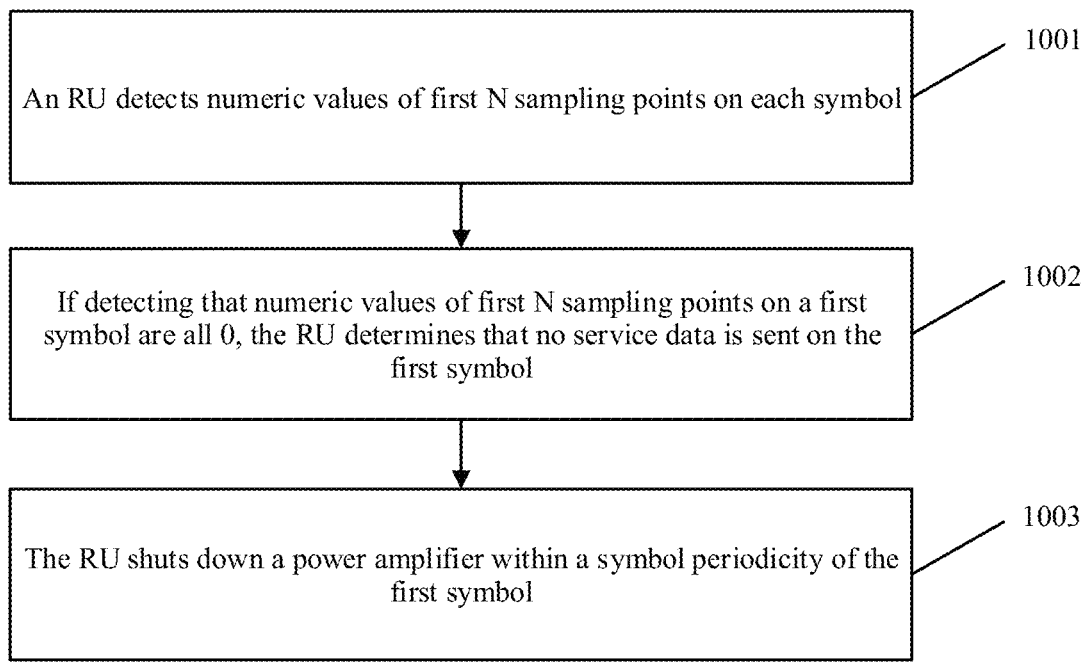
FIG. 10 is a schematic flowchart of another symbol processing method according to an embodiment of this application.

FIG. 10 is a schematic flowchart of another symbol processing method according to an embodiment of this application. The method shown in FIG. 10 may include the following steps.

1001. An RU detects numeric values of first N sampling points on each symbol, where N is a positive integer greater than 0.

In an embodiment, a value of N may be determined based on a cell bandwidth. For example, if the cell bandwidth is 20 MHz, the RU may detect the first 32 sampling points on each symbol. If the cell bandwidth is 10 MHz, the RU may detect the first 16 sampling points on each symbol. If the cell bandwidth is 5 MHz, the RU may detect the first eight sampling points on each symbol.

A length of one sampling point may be determined based on a sampling frequency. For example, when the cell bandwidth is 20 MHz, the sampling frequency may be 30.72 MHz, and a length of one sampling point may be 1/30.72 ms. If the cell bandwidth is 10 MHz, the sampling frequency may be 15.36 MHz, and the length of one sampling point may be 1/15.36 ms. Certainly, the foregoing manners are merely examples and are not exhaustive examples, and manners include but are not limited to the foregoing optional manners.

1002. If detecting that numeric values of first N sampling points on the first symbol are all 0, the RU determines that no service data is sent on the first symbol.

In an embodiment, if detecting that the numeric values of the first N sampling points on the first symbol are all 0, the RU may consider that no service data is sent on the first symbol, and the first symbol is a service-idle symbol.

1003. The RU shuts down a power amplifier within a symbol periodicity of the first symbol, where symbol periodicities of symbols are the same.

In an embodiment, a BBU modifies a format of a target subframe, so that the symbol periodicities of the symbols are the same, and the target subframe is a service-idle subframe.

The BBU may determine, based on a current traffic volume of a cell, the target subframe in which energy saving is required, and modify the format of the target subframe, so that symbol periodicities of symbols on a carrier are the same.

In an embodiment, the symbol periodicity may be the same as a symbol periodicity of a subframe with a normal CP. When detecting that the numeric values of the first N sampling points on the first symbol are all 0, the RU may shut down the power amplifier based on the symbol periodicity of the subframe with the normal CP.

In an embodiment, after shutting down the power amplifier, if detecting that numeric values of first N sampling points on a second symbol are not all 0, the RU determines that service data is sent on the second symbol; and turns on the power amplifier at a preset time point before a symbol periodicity of the second symbol arrives.

For example, the preset time point may be in microseconds. After shutting down a PA within the symbol periodicity of the first symbol, the RU continues to measure subsequent symbols. If it is measured that numeric values of first N sampling points on the second symbol are not all 0, the RU may turn on the power amplifier in advance within the first m microseconds before the symbol periodicity of the second symbol arrives. In this way, normal transmission of the service data is not affected.

It can be learned that, according to this embodiment of this application, the RU detects the numeric values of the first N sampling points on each symbol. If detecting that the numeric values of the first N sampling points on the first symbol are all 0, the RU may determine that no service data is sent on the first symbol, and shut down the PA within the symbol periodicity of the first symbol. The BBU no longer needs to notify the RU of configuration information of a subframe, and the RU can shut down the PA based on a fixed symbol periodicity, thereby reducing information resource overheads between the BBU and the RU, and simplifying a symbol power saving implementation procedure.

Figure 11:
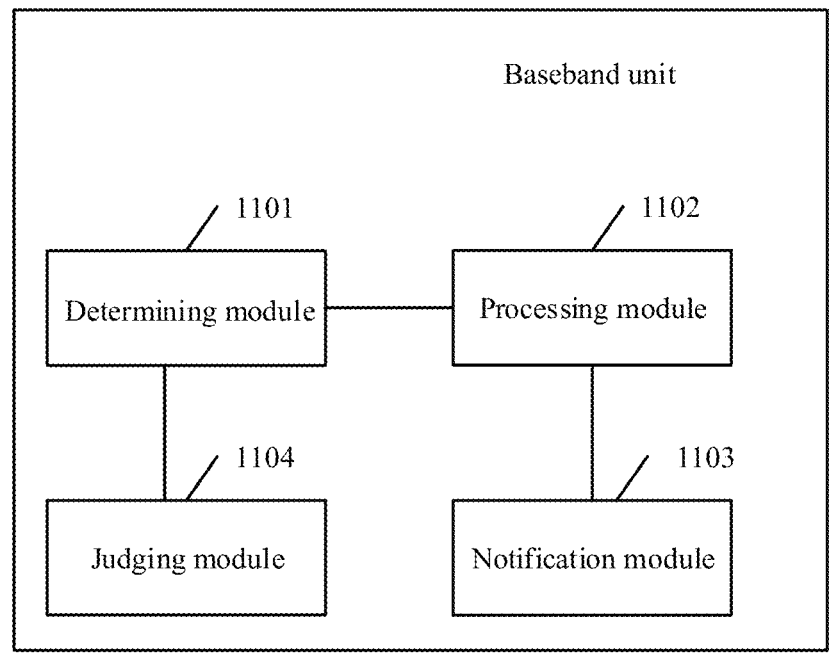
FIG. 11 is a schematic structural diagram of a baseband unit according to an embodiment of this application.

FIG. 11 is a schematic structural diagram of a baseband unit according to an embodiment of this application. The baseband unit shown in FIG. 11 may include a determining module 1101 and a processing module 1102.

The determining module 1101 is configured to determine, based on a current traffic volume of a cell, a target subframe in which energy saving is required.

The target subframe is a service-idle subframe.

The processing module 1102 is configured to modify a format of the target subframe, so that symbol periodicities of symbols are the same.

In an embodiment, the baseband unit further includes: a notification module 1103, configured to notify a terminal of configuration information of the target subframe, so that the terminal avoids measuring the target subframe.

The configuration information includes at least a quantity of target subframes and location information of the target subframes.

In an embodiment, the target subframe is a multimedia broadcast multicast service single frequency network MBSFN subframe.

The processing module 1102 is specifically configured to modify a format of a symbol that uses an extended cyclic prefix and that is in the target subframe to a format of a symbol with a normal cyclic prefix, so that the symbol periodicities of the symbols are the same as a symbol periodicity of the symbol with the normal cyclic prefix, where a total quantity of symbols of the target subframe is the same as a total quantity of symbols of a subframe with the normal cyclic prefix.

In an embodiment, the baseband unit further includes: a judging module 1104, configured to determine whether a target-subframe-related configuration function is in an enabled state; and if the target-subframe-related configuration function is in the enabled state, determine, by using the determining module 1101 based on the current traffic volume of the cell, the target subframe in which energy saving is required.

In an embodiment, the determining module 1101 is specifically configured to: detect a current traffic volume of a cell based on a preset periodicity, and determine, based on the detected current traffic volume, the target subframe in which energy saving is required within the preset periodicity, where determined content includes at least a quantity of target subframes and location information of the target subframes.

Figure 12:
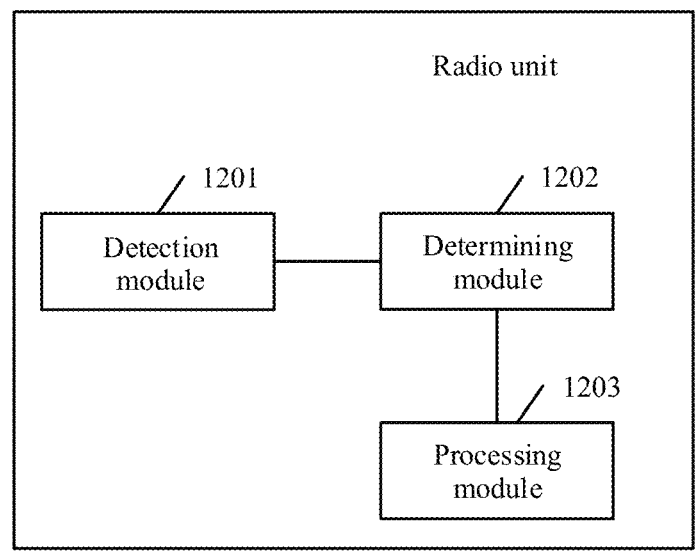
FIG. 12 is a schematic structural diagram of a radio unit according to an embodiment of this application.

FIG. 12 is a schematic structural diagram of a radio unit according to an embodiment of this application. The radio unit shown in FIG. 12 may include:

a detection module 1201, configured to detect numeric values of first N sampling points on each symbol, where N is a positive integer greater than 0;

a determining module 1202, configured to: if it is detected that numeric values of first N sampling points on a first symbol are all 0, determine that no service data is sent on the first symbol; and a processing module 1203, configured to shut down a power amplifier within a symbol periodicity of the first symbol, where symbol periodicities of symbols are the same.

The baseband unit modifies a format of a target subframe, so that the symbol periodicities of the symbols are the same, and the target subframe is a service-idle subframe.

In an embodiment, the determining module 1202 is further configured to: if it is detected that numeric values of first N sampling points on a second symbol are not all 0, determine that no service data is sent on the second symbol; and the processing module 1203 is further configured to turn on the power amplifier at a preset time point before a symbol periodicity of the second symbol arrives.

Figure 13:
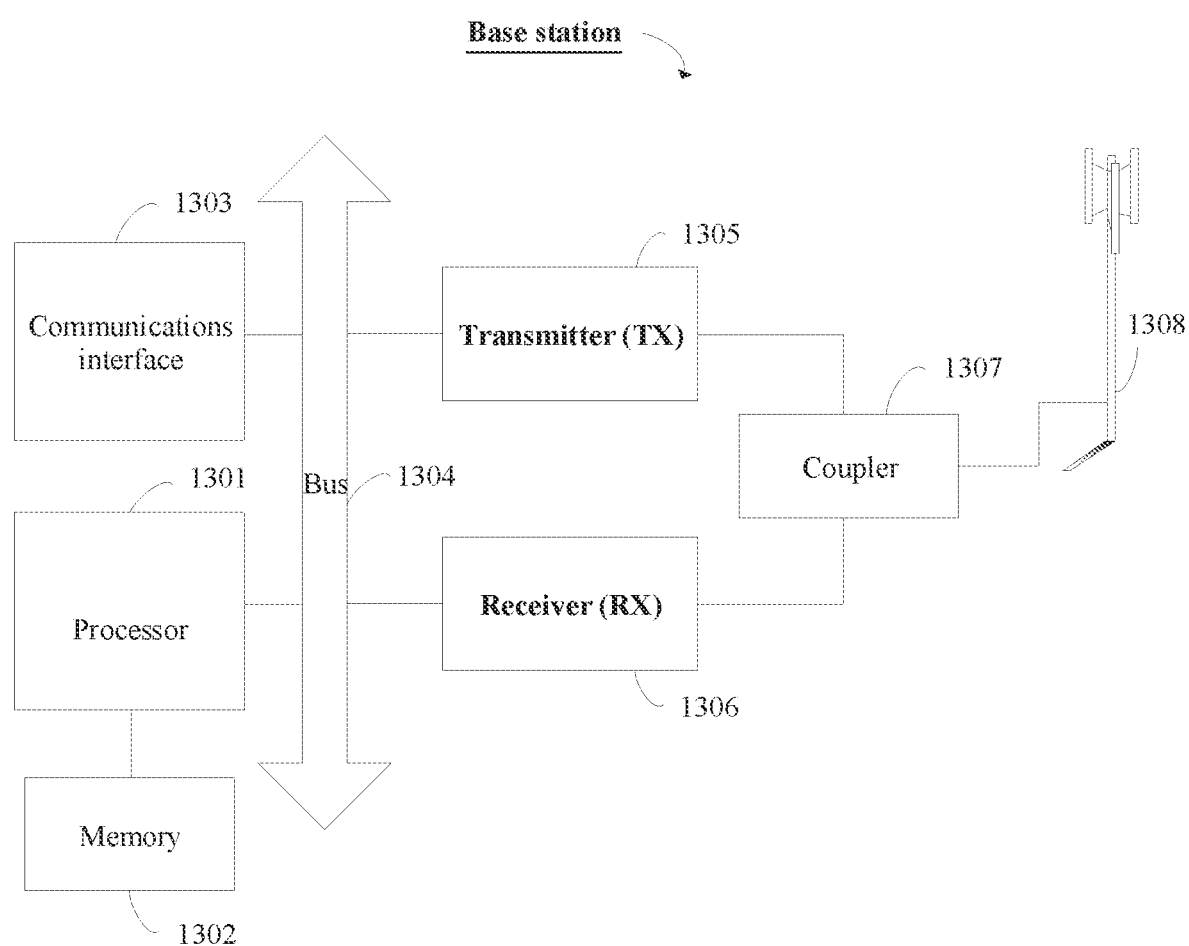
FIG. 13 is a schematic structural diagram of another base station according to an embodiment of this application.

FIG. 13 is a schematic structural diagram of another base station according to an embodiment of this application. The base station shown in FIG. 13 may include:

one or more processors 1301, a memory 1302, a communications interface 1303, a transmitter 1305, a receiver 1306, a coupler 1307, and an antenna 1308. These components may be connected through a bus 1304 or in another manner. In FIG. 13, an example in which the components are connected through the bus is used.

The communications interface 1303 may be used for communication between a network device and another communications device, for example, a terminal device or another network device. Specifically, the terminal device may be the terminal device shown in FIG. 9. Specifically, the communications interface 1303 may be a long term evolution (LTE) (4G) communications interface, or may be a 5G communications interface or a future new radio communications interface. In addition to a wireless communications interface, the network device may be further configured with a wired communications interface 1303 to support wired communication. For example, a backhaul link between a network device and another network device may be a wired communication connection.

The transmitter 1305 may be configured to perform transmit processing, for example, signal modulation, on a signal output by the processor 1301. The receiver 1306 may be configured to perform reception processing, for example, signal demodulation, on a mobile communication signal received through the antenna 1308. In some embodiments of this application, the transmitter 1305 and the receiver 1306 may be considered as a wireless modem. There may be one or more transmitters 1305 and receivers 1306 in the network device. The antenna 1308 may be configured to convert electromagnetic energy in a transmission line into an electromagnetic wave in free space, or convert an electromagnetic wave in free space into electromagnetic energy in a transmission line. The coupler 1307 may be configured to divide a mobile communication signal into a plurality of signals, and allocate the plurality of signals to a plurality of receivers 1306.

The memory 1302 is coupled to the processor 1301, and is configured to store various software programs and/or a plurality of groups of instructions. Specifically, the memory 1302 may include a high-speed random access memory, and may further include a non-volatile memory, for example, one or more disk storage devices, a flash storage device, or another non-volatile solid-state storage device. The memory 1302 may store an operating system (which is briefly referred to as a system below), for example, an embedded operating system such as uCOS, VxWorks, or RTLinux. The memory 1302 may further store a network communications program. The network communications program may be configured to communicate with one or more additional devices, one or more terminal devices, or one or more network devices.

The processor 1301 may be configured to: perform radio channel management, calling implementation, and communications link establishment and disconnecting; and provide cell handover control and the like for a user in a current control area. Specifically, the processor 1301 may include an administration/communications module (Administration Module/Communication Module, AM/CM) (which is a center for speech channel switching and information exchange), a basic module (Basic Module, BM) (which is configured to implement call processing, signaling processing, radio resource management, radio link management, and circuit maintenance functions), a transcoder and submultiplexer (Transcoder and SubMultiplexer, TCSM) (which is configured to implement multiplexing/demultiplexing and transcoding functions), and the like.

In this embodiment of this application, the processor 1301 may be configured to read and execute a computer-readable instruction. In an embodiment, the processor 1301 may invoke the program in the memory 1302 to perform the following steps:

determining, based on a current traffic volume of a cell, a target subframe in which energy saving is required, where the target subframe is a service-idle subframe;

modifying a format of the target subframe, so that symbol periodicities of symbols are the same;

detecting numeric values of first N sampling points on each symbol, where N is a positive integer greater than 0;

if it is detected that numeric values of first N sampling points on a first symbol are all 0, determining that no service data is sent on the first symbol; and shutting down a power amplifier within a symbol periodicity of the first symbol, where the symbol periodicities of the symbols are the same.

It should be further noted that the processor 1301 may be configured to invoke the program stored in the memory 1302, for example, a program for implementing, on a network device side, the power adjustment method provided in one or more embodiments of this application, and execute an instruction included in the program. Details are not described herein.

It may be understood that the network device may be the base station 101 shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device shown in FIG. 13 is merely an implementation of the embodiments of this application. During actual application, the network device may further include more or fewer components, and this is not limited herein.

It should be understood that this embodiment of the present invention is an entity apparatus embodiment corresponding to the method embodiment, and description of the method embodiment is also applicable to this embodiment of the present invention.

Another embodiment of this application provides a computer-readable storage medium. The computer-readable storage medium stores a program. When the program is executed by a processor, the method shown in the terminal device in this application or the method shown in the network device may be implemented.

It should be noted that, for a specific process in which the computer-readable storage medium is executed by the processor, refer to the method described in the foregoing method embodiments, and details are not described herein again.

Still another embodiment of the present invention further provides a computer program product including an instruction. When the computer program product runs on a computer, the computer is enabled to perform the method according to the foregoing method embodiments.

The computer-readable storage medium may be an internal storage unit of the terminal described in any one of the foregoing embodiments, for example, a hard disk or a memory of the terminal. The computer-readable storage medium may alternatively be an external storage device of the computer, for example, a plug-connected hard disk, smart media card (Smart Media Card, SMC), secure digital (Secure Digital, SD) card, or flash memory card (Flash Card) provided on the computer. Further, the computer-readable storage medium may alternatively include both the internal storage unit and the external storage device of the terminal. The computer-readable storage medium is configured to store the program and another program and data required by the terminal. The computer-readable storage medium may be further configured to temporarily store data that has been output or is to be output.

Based on a same inventive concept, a problem-resolving principle of the computer provided in this embodiment of the present invention is similar to that of the method embodiment of the present invention. Therefore, for implementation of the computer, refer to implementation of the method. For brevity of description, details are not described herein again.

A person of ordinary skill in the art may understand that all or some of the procedures of the methods in the embodiments may be implemented by a program instructing relevant hardware. The program may be stored in a computer-readable storage medium. When the program runs, the procedures of the methods in the embodiments are performed. The storage medium may be a magnetic disk, an optical disc, a read-only memory (Read-Only Memory, ROM), a random access memory (Random Access Memory, RAM), or the like.

The symbol processing method and the related device provided in the embodiments of the present invention are described in detail above. The principle and implementation of the present invention are described through specific examples in this specification. The description about the foregoing embodiments is merely provided to help understand the structure, the method, and core ideas of the present invention. In addition, a person skilled in the art can make changes in terms of the specific implementations and application scopes according to the ideas of the present invention. In conclusion, content of this specification shall not be construed as a limit to the present invention.

What is claimed is:

1. A symbol processing method, applied to a baseband unit, wherein the method comprises:
determining, based on a current traffic volume of a cell, a target subframe in which energy saving is required, wherein the target subframe is a service-idle subframe; and
modifying a format of the target subframe, wherein before modifying the format of the target subframe, at least two symbols in the target subframe have different symbol periodicities, wherein after modifying the format of the target subframe, each symbol in the target subframe has a same symbol periodicity, wherein the target subframe is a multimedia broadcast multicast service single frequency network (MBSFN) subframe, and wherein modifying the format of the target subframe comprises:
modifying a format of a symbol that uses an extended cyclic prefix and that is in the target subframe to a format of a symbol with a normal cyclic prefix, wherein the symbol periodicities of the symbols in the target subframe are the same as a symbol periodicity of the symbol with the normal cyclic prefix, and wherein a total quantity of symbols of the target subframe is the same as a total quantity of symbols of a subframe with the normal cyclic prefix.

2. The method according to claim 1, wherein after modifying the format of the target subframe, the method further comprises:
notifying a terminal of configuration information of the target subframe, wherein the terminal avoids measuring the target subframe, and wherein the configuration information comprises at least a quantity of target subframes and location information of the target subframes.

3. The method according to claim 1, wherein before determining, based on the current traffic volume of the cell, the target subframe in which energy saving is required, the method further comprises:
determining whether a target-subframe-related configuration function is in an enabled state; and
in response to determining that the target-subframe-related configuration function is in the enabled state, determining, based on the current traffic volume of the cell, the target subframe in which energy saving is required.

4. The method according to claim 1, wherein determining, based on the current traffic volume of the cell, the target subframe in which energy saving is required comprises:
detecting the current traffic volume of the cell based on a preset periodicity; and
determining, based on the detected current traffic volume, the target subframe in which energy saving is required within the preset periodicity, wherein determined content comprises at least a quantity of target subframes and location information of the target subframes.

5. A baseband unit, comprising:
at least one processor; and
one or more memories coupled to the at least one processor and storing programming instructions for execution by the at least one processor to:
determine, based on a current traffic volume of a cell, a target subframe in which energy saving is required, wherein the target subframe is a service-idle subframe; and
modify a format of the target subframe, wherein before modifying the format of the target subframe, at least two symbols in the target subframe have different symbol periodicities, wherein after modifying the format of the target subframe, each symbol in the target subframe has a same symbol periodicity, wherein the target subframe is a multimedia broadcast multicast service single frequency network (MBSFN) subframe, and wherein modifying the format of the target subframe comprises:
modifying a format of a symbol that uses an extended cyclic prefix and that is in the target subframe to a format of a symbol with a normal cyclic prefix, wherein the symbol periodicities of the symbols in the target subframe are the same as a symbol periodicity of the symbol with the normal cyclic prefix, and wherein a total quantity of symbols of the target subframe is the same as a total quantity of symbols of a subframe with the normal cyclic prefix.

6. The baseband unit according to claim 5, wherein the programming instructions are for execution by the at least one processor to:
notify a terminal of configuration information of the target subframe, wherein the terminal avoids measuring the target subframe, and wherein the configuration information comprises at least a quantity of target subframes and location information of the target subframes.

7. The baseband unit according to claim 5, wherein the programming instructions are for execution by the at least one processor to:
determine whether a target-subframe-related configuration function is in an enabled state; and
in response to determining that the target-subframe-related configuration function is in the enabled state, determine, based on the current traffic volume of the cell, the target subframe in which energy saving is required.

8. The baseband unit according to claim 5, wherein the programming instructions are for execution by the at least one processor to:
detect the current traffic volume of the cell based on a preset periodicity; and
determine, based on the detected current traffic volume, the target subframe in which energy saving is required within the preset periodicity, wherein determined content comprises at least a quantity of target subframes and location information of the target subframes.

9. A non-transitory computer-readable storage media comprising instructions which, when executed by one or more processors, cause the one or more processors to perform operations comprising:
determining, based on a current traffic volume of a cell, a target subframe in which energy saving is required, wherein the target subframe is a service-idle subframe; and
modifying a format of the target subframe, wherein before modifying the format of the target subframe, at least two symbols in the target subframe have different symbol periodicities, wherein after modifying the format of the target subframe, each symbol in the target subframe has a same symbol periodicity, wherein the target subframe is a multimedia broadcast multicast service single frequency network (MBSFN) subframe, and wherein modifying the format of the target subframe comprises:
modifying a format of a symbol that uses an extended cyclic prefix and that is in the target subframe to a format of a symbol with a normal cyclic prefix, wherein the symbol periodicities of the symbols in the target subframe are the same as a symbol periodicity of the symbol with the normal cyclic prefix, and wherein a total quantity of symbols of the target subframe is the same as a total quantity of symbols of a subframe with the normal cyclic prefix.

10. The non-transitory computer-readable storage media according to claim 9, wherein after modifying the format of the target subframe, the operations further comprise:
notifying a terminal of configuration information of the target subframe, wherein the terminal avoids measuring the target subframe, and wherein the configuration information comprises at least a quantity of target subframes and location information of the target subframes.

11. The non-transitory computer-readable storage media according to claim 9, wherein before determining, based on the current traffic volume of the cell, the target subframe in which energy saving is required, the operations further comprise:
determining whether a target-subframe-related configuration function is in an enabled state; and
in response to determining that the target-subframe-related configuration function is in the enabled state, determining, based on the current traffic volume of the cell, the target subframe in which energy saving is required.

12. The non-transitory computer-readable storage media according to claim 9, wherein determining, based on the current traffic volume of the cell, the target subframe in which energy saving is required comprises:
detecting the current traffic volume of the cell based on a preset periodicity; and determining, based on the detected current traffic volume, the target subframe in which energy saving is required within the preset periodicity, wherein determined content comprises at least a quantity of target subframes and location information of the target subframes.

\* \* \* \* \*